(12) United States Patent
Osborn et al.

(10) Patent No.: US 12,208,584 B2
(45) Date of Patent: Jan. 28, 2025

(54) SYSTEM FOR SEALING AN ARTICLE

(71) Applicant: Capital One Services, LLC, McLean, VA (US)

(72) Inventors: Kevin Osborn, Newton Highlands, MA (US); David Kelly Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 321 days.

(21) Appl. No.: 17/652,813

(22) Filed: Feb. 28, 2022

(65) Prior Publication Data

US 2023/0271387 A1    Aug. 31, 2023

(51) Int. Cl.
*B29C 65/20* (2006.01)
*B25J 11/00* (2006.01)
*B65B 51/14* (2006.01)
*B29K 701/12* (2006.01)

(52) U.S. Cl.
CPC ............. *B29C 65/20* (2013.01); *B25J 11/005* (2013.01); *B65B 51/14* (2013.01); *B29K 2701/12* (2013.01)

(58) Field of Classification Search
CPC ...... B29C 65/20; B29C 66/863; B25J 11/005; B65B 51/14
See application file for complete search history.

(56) References Cited

U.S. PATENT DOCUMENTS

| 3,681,177 | A | * | 8/1972 | Preston | ...................... B65B 9/06 156/583.9 |
| 5,061,331 | A | * | 10/1991 | Gute | ...................... B26D 7/018 156/251 |
| 6,193,833 | B1 | * | 2/2001 | Gizowski | ............ B29C 66/1312 219/121.64 |
| 2004/0154737 | A1 | * | 8/2004 | Chen | .................... B29C 66/5326 156/272.8 |

FOREIGN PATENT DOCUMENTS

KR       2011083507 A * 7/2011   ......... B29C 65/1619

* cited by examiner

*Primary Examiner* — Daniel McNally
(74) *Attorney, Agent, or Firm* — Harrity & Harrity, LLP

(57) ABSTRACT

In some implementations, a device for heat sealing may include a positioning device configured to move in at least two dimensions, and a sealing head attached to the positioning device. The sealing head may include an energy system configured to generate energy for heat sealing an article along a path of an arbitrary shape.

20 Claims, 6 Drawing Sheets

SYSTEM FOR SEALING AN ARTICLE

BACKGROUND

Heat sealing uses heat and pressure to join together multiple layers or parts, at least one of which includes a thermoplastic material. Heat sealing may be used to seal products, packaging, or other types of containers. Heat sealing may be performed using a heated die or sealing bar to apply heat to a specific contact area or path of a thermoplastic material, thereby fusing the thermoplastic material with an adjacent material (e.g., another similar thermoplastic material or a non-thermoplastic material).

SUMMARY

In some implementations, a system for heat sealing includes a bed having a first surface that includes a resilient lining; a positioning device configured to move in at least two dimensions relative to the first surface of the bed; a sealing head attached to the positioning device, the sealing head including a heating element and a tip element having a second surface, for contacting an article to be sealed, that is convex and non-stick; and a controller configured to: obtain information that indicates a sequence of positions for the positioning device for a sealing operation that is to produce a sealed path of an arbitrary shape on the article; and cause the positioning device to move relative to the first surface of the bed according to the sequence of positions for the sealing operation.

In some implementations, a device for heat sealing includes a positioning device configured to move in at least two dimensions; and a sealing head attached to the positioning device, the sealing head including an energy system configured to generate energy for heat sealing an article along a path of an arbitrary shape.

In some implementations, a method for heat sealing includes obtaining, by a device, information that indicates, for a positioning device of the device, a sequence of positions for a sealing operation to be performed on an article, where a sealing head is attached to the positioning device, the sealing head including an energy system configured to generate energy for sealing the article; and moving, by the device, the positioning device in at least two dimensions relative to the article according to the sequence of positions for the sealing operation, where the energy from the energy system seals the article, in accordance with movement of the positioning device, along a path of an arbitrary shape.

DETAILED DESCRIPTION

The following detailed description of example implementations refers to the accompanying drawings. The same reference numbers in different drawings may identify the same or similar elements.

A sealing machine may be used to seal the edges of plastic sheeting to produce bags, containers, clothing, and other enclosures. Typically, a sealing machine is capable of sealing only along straight lines. In some cases, a sealing machine may be configured for sealing along paths having more complex geometries (e.g., curves, oblique angles, or the like) using custom-shaped dies or heating elements. Thus, a sealing machine may have limited sealing capabilities, thereby requiring the use of multiple machines to perform various sealing tasks, and/or the sealing machine may have significant downtime to allow for machine setup for various custom-shaped heating elements to be fitted. Moreover, sealing in a complex geometry may involve multiple sealing passes using different custom-shaped dies or heating elements for each pass. However, sealing with multiple passes is error prone, as the article being sealed must be precisely aligned for each pass to achieve proper sealing.

Some implementations described herein provide a sealing system capable of sealing along customizable two-dimensional and three-dimensional paths. The sealing system may include a positioning device, such as a robotic arm or a Cartesian coordinate robot, that is configured to move in at least two dimensions. Moreover, the sealing system may include a sealing head attached to the positioning device. The sealing head may include an energy system, such as a heating element or an ultrasonic transmitter, for providing the energy used for sealing. Thus, the positioning device may move the sealing head along any arbitrary (e.g., relative to a shape of the sealing head) two-dimensional or three-dimensional path to produce articles that are sealed with various complex geometries. In addition, a path used by the positioning device may be programmed to the sealing system, thereby enabling a single sealing system to execute numerous different sealing geometries. Moreover, the sealing system may quickly switch between programmed sealing paths to reduce downtime between different sealing operations.

Figure 1:
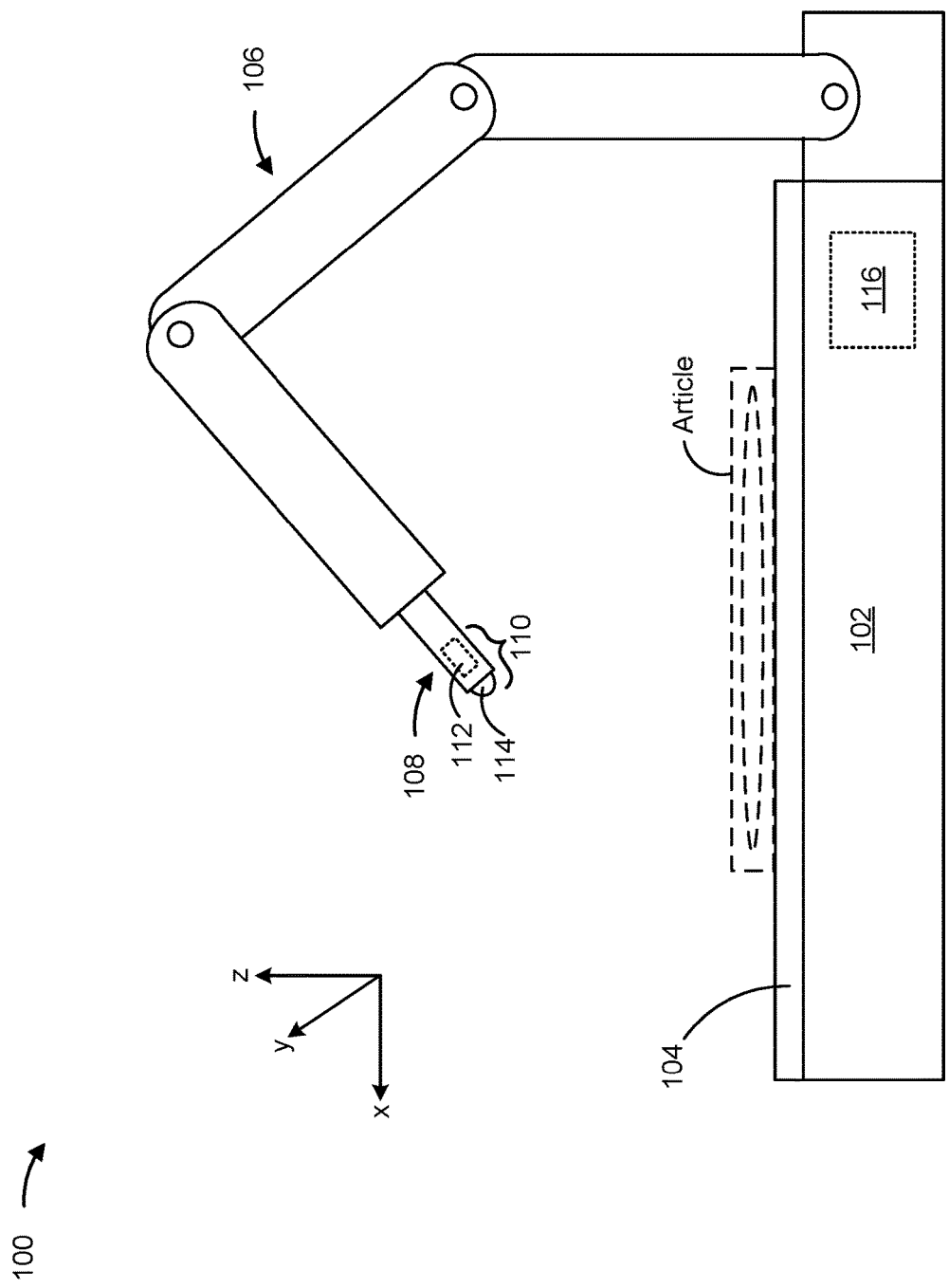
FIG. 1 shows an example sealing system.

FIG. 1 shows an example sealing system 100. The sealing system 100 may include a device (e.g., a machine) capable of performing operations associated with heat sealing or heat shrinking an article. For example, the article may be a container (e.g., a bag), clothing, heat-shrink tubing, or another type of enclosure (e.g., a housing for an electronic device). The article may include a thermoplastic material that can be fused by heat sealing or shrunk by heat shrinking. As used herein, "sealing" the article may include sealing an entire perimeter of the article, sealing a partial perimeter of the article, sealing one or more interior areas of the article, and/or heat shrinking the article, among other examples. The sealing system 100 may be configured, as described herein, to seal an article along a path of an arbitrary shape (e.g., a customizable and/or programmable shape that is not constrained by a shape of a heating element of the sealing system 100, a shape in which one or more ultrasonic transmitters of the sealing system 100 are arranged, or the like).

The sealing system 100 may include a bed 102. The bed 102 may be a plate, a tray, or another substrate configured to support an article that is to be sealed (shown as a container in FIG. 1) during a sealing operation. A surface of the bed 102 may include a lining 104. The lining 104 may be a sheet, a spray coating, or the like, that is applied to the surface of the bed 102. The lining 104 may be resilient, heat-resistant, and/or non-stick (e.g., prevents or resists adherence of the article during a sealing operation). For example, the lining 104 may be a silicone, polytetrafluoroethylene (PTFE), a coated paper (e.g., a parchment paper or a silicone-coated paper), or the like.

The sealing system 100 may include a positioning device 106. The positioning device 106 may be configured to move in at least two dimensions (e.g., relative to the surface of the bed 102 and/or relative to the article to be sealed). For example, the positioning device 106 may be configured to move in a direction of at least two of the x-axis, the y-axis, and the z-axis shown. In some implementations, the positioning device 106 may be configured to move in at least three dimensions (e.g., relative to the surface of the bed 102 and/or relative to the article to be sealed). For example, the positioning device 106 may be configured to move in a direction of all of the x-axis, the y-axis, and the z-axis shown. In some implementations, the positioning device 106 may have at least three degrees of freedom, at least four degrees of freedom, at least five degrees of freedom, or at least six degrees of freedom. For example, the positioning device 106 may be capable of translational movement in two dimensions or in three dimensions, and/or the positioning device 106 may be capable of rotational movement about axes in one dimension, in two dimensions, or in three dimensions. The positioning device 106 may be a Cartesian coordinate robot (e.g., a plotter), a robotic arm (e.g., a selective compliance assembly robot arm (SCARA)), or the like.

The sealing system 100 may include a sealing head 108. The sealing head 108 may include a housing, or the like, for supporting various components of the sealing system 100, as described herein. The sealing head 108 may be attached to the positioning device 106. For example, the sealing head 108 may be attached to a carriage (not shown) of a Cartesian coordinate robot. As another example, the sealing head 108 may be attached to a free end (e.g., a distal end) of a robotic arm. In this way, the positioning device 106 may move the sealing head 108 in various two-dimensional or three-dimensional patterns relative to an article to be sealed (e.g., relative to the bed 102).

The sealing head 108 may include an energy system 110. The energy system 110 may be configured to generate energy for sealing an article (e.g., along a path of an arbitrary shape). For example, the energy system 110 may be configured to generate heat, ultrasound, a magnetic field, vibration, or another type of energy capable of producing heat at the article.

In some implementations, the energy system 110 may include one or more ultrasonic transmitters. Here, the ultrasonic transmitter(s) may be in any spatial configuration in the sealing head 108 (e.g., rather than in a spatial configuration that corresponds to a shape of a sealing path that is to be used). In some implementations, the energy system 110 may include a heating element 112 and a tip element 114. The heating element 112 may include a resistive heating element, an inductive heating element, or the like. The tip element 114 may be heat conductive (e.g., the tip element 114 may include a metal). The tip element 114 may be for contacting an article to be sealed (e.g., the tip element 114 may extend from a housing of the sealing head 108). The heating element 112 and the tip element 114 may be in an arrangement that allows for heat transfer from the heating element 112 to the tip element 114 or that allows for the heating element 112 to induce heating of the tip element 114.

In some implementations, the sealing system 100 may include a placing device (not shown) for positioning the article to be sealed on the surface of the bed 102 or otherwise positioning the article to be sealed in proximity of the sealing head 108. For example, the placing device may include one or more conveyors, one or more unspooling machines, one or more pick-and-place machines, one or more robotic arms, or the like. In some implementations, the sealing system 100 may include an inflation device (not shown) for inflating the article to a maximum volume to facilitate sealing operations on the article. The inflation device may be configured to propel a fluid (e.g., air, water, or the like) through or into the article. For example, the inflation device may include one or more pumps, one or more compressors, or the like.

The sealing system 100 may include a controller 116. The controller 116 may include one or more memories and/or one or more processors configured to perform operations for controlling the sealing system 100. In some implementations, the controller 116 may obtain information that indicates a sequence of positions for the positioning device 106 that are to be used for a sealing operation (e.g., heat sealing or heat shrinking) that is to produce a sealed path of an arbitrary shape on an article. For example, the information may include a set of coordinates (e.g., x, y, and/or z coordinates) that define the sequence of positions. As another example, the information may include a sequence of kinematic movement instructions for the positioning device 106. The controller 116 may obtain the information from a local or remote storage location. In some implementations, to obtain the information, the controller 116 may receive the information from a user device that is communicatively connected (e.g., by wires or wirelessly) to the sealing system 100.

In some implementations, the controller 116 may cause an article to be positioned on the surface of the bed 102 or otherwise positioned in proximity of the sealing head 108. For example, the controller 116 may cause activation and/or actuation of the placing device in order to position the article. In some implementations, the controller 116 may cause inflation of the article (e.g., to a maximum volume for the article). For example, the controller 116 may cause activation of the inflation device (e.g., following positioning of the article). Moreover, the controller 116 may cause activation of the energy system 110 in order to generate the energy for heat sealing or heat shrinking the article. For example, the controller 116 may cause electrical current to flow to the energy system 110 in order to activate the energy system 110.

After the article is positioned, the controller 116 may cause movement of the positioning device 106 relative to the article according to the sequence of positions. For example, the controller 116 may cause movement of the positioning device 106 in at least two dimensions relative to the article. While the positioning device 106 is moved, energy from the energy system 110 seals the article along a path of an arbitrary shape that is in accordance with the movement of the positioning device 106. In this way, customizable, precise, and complex geometries for sealing may be achieved.

As indicated above, FIG. 1 is provided as an example. Other examples may differ from what is described with regard to FIG. 1.

Figure 2:
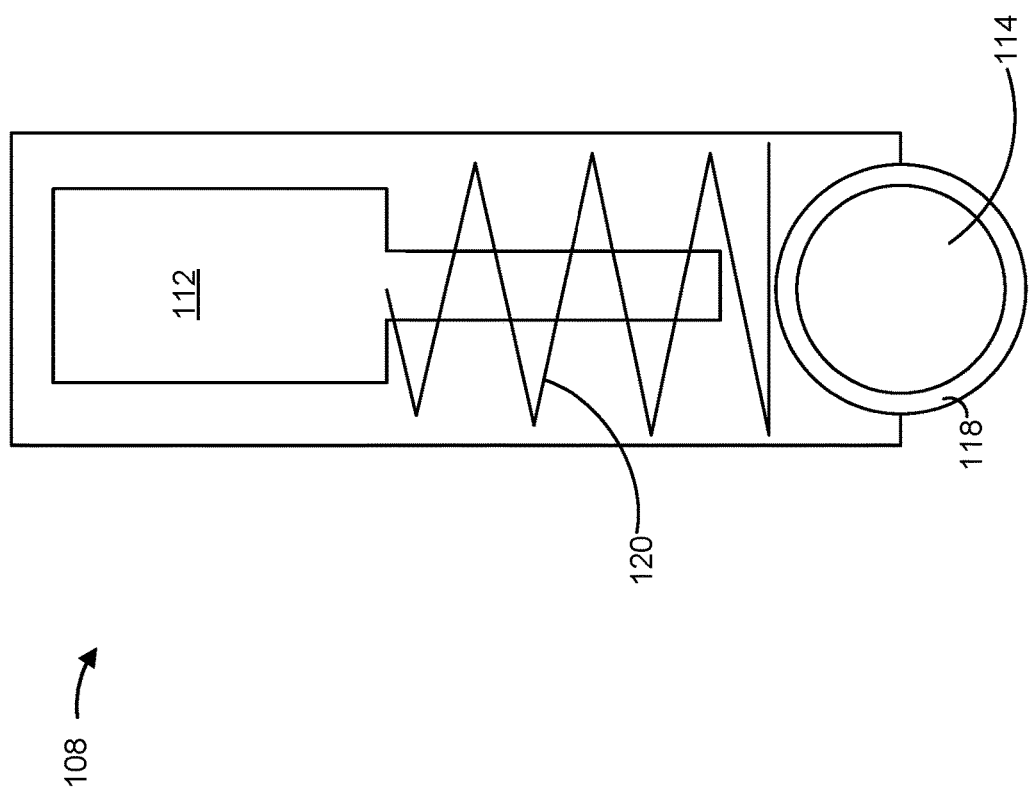
FIG. 2 shows a cross-sectional view of an example sealing head of the sealing system of FIG. 1.

FIG. 2 shows a cross-sectional view of an example sealing head 108 of the sealing system 100. As described herein, the sealing head 108 may include a heating element 112 and a tip element 114. The tip element 114 may have a surface that is convex. For example, the tip element 114 may be spherical, as shown. The surface of the tip element 114 may be non-stick, as described herein. For example, the tip element 114 may include a heat-conducting (e.g., metal) core that is covered by a coating 118 that is non-stick. The coating 118

(e.g., the surface of the tip element 114) may include borosilicate glass, ceramic, or the like.

In some implementations, the sealing head 108 may include a spring element 120 (e.g., a spring or another resilient element). The spring element 120 may be configured to spring-load the tip element 114. For example, the spring element 120 may bias the tip element 114 to extend from a housing of the sealing head 108. The sealing head 108 may be configured to provide heat transfer from the heating element 112 to the tip element 114 when the spring element 120 is compressed (e.g., due to pressing the tip element 114 on an article during sealing). For example, when the spring element 120 is uncompressed, the heating element 112 and the tip element 114 may not be in contact (as shown), whereas the tip element 114 may compress the spring element 120 when a force is applied to the tip element 114 such that the tip element 114 is allowed to contact the heating element 112. As another example, compression of the spring element 120 may control a switch (not shown) that controls the flow of electrical current to the heating element 112, where the switch is open when the spring element 120 is uncompressed and the switch is closed when the spring element 120 is compressed.

As indicated above, FIG. 2 is provided as an example. Other examples may differ from what is described with regard to FIG. 2.

Figure 3:
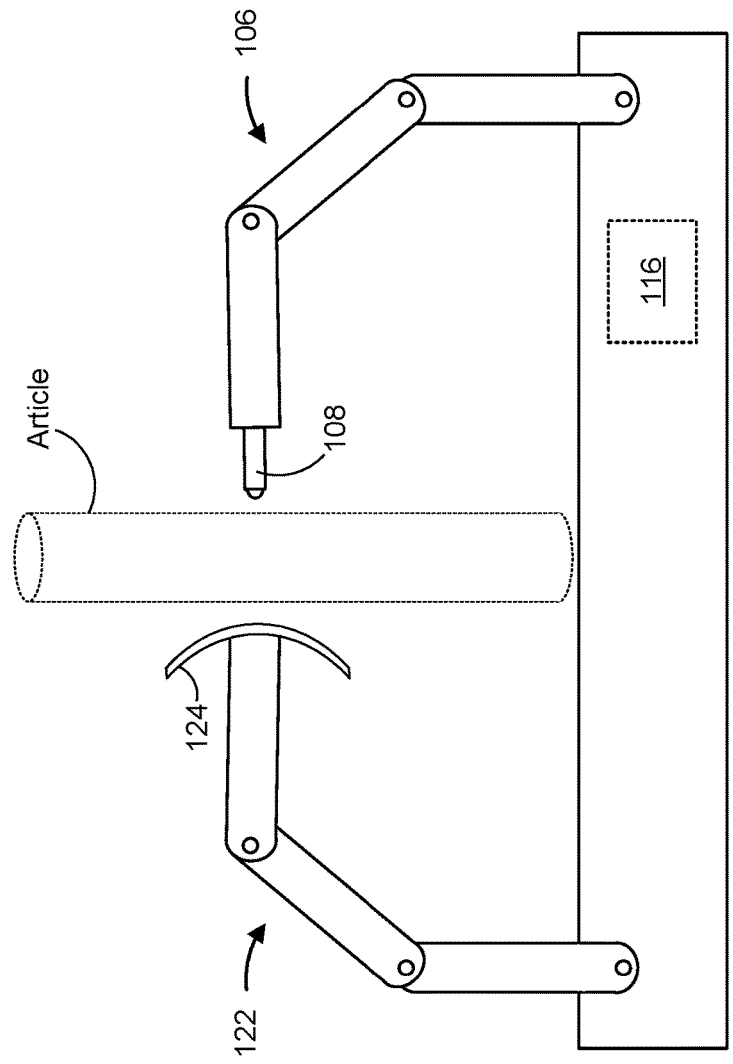
FIG. 3 shows an example embodiment of the sealing system of FIG. 1.

FIG. 3 shows an example embodiment of the sealing system 100. As shown in FIG. 3, the sealing system 100 may include the positioning device 106, which may be a robotic arm, and the sealing system 100 may include an additional robotic arm 122. The additional robotic arm 122 may be the same, or a different, type of robotic arm as the positioning device 106. A backing element 124 may be attached to the free end of the additional robotic arm 122. The backing element 124 may have similar properties as the lining 104, described herein. The backing element 124 may include a flat plate, a curved plate (as shown), a sphere, a spheroid, or another surface capable of opposing pressing of the sealing head 108 attached to the positioning device 106 during a sealing operation and/or capable of manipulating a form of an article during a sealing operation.

The additional robotic arm 122 may be configured to position the backing element 124 opposite the sealing head 108 during a sealing operation (e.g., such that an article to be sealed is between the sealing head 108 and the backing element 124). For example, during the sealing operation, the additional robotic arm 122 may mirror a movement of the positioning device 106 so that the backing element 124 remains opposite the sealing head 108 and can oppose pressing of the sealing head 108 on the article. In some implementations, the controller 116 may cause moving of the additional robotic arm 122 in concert with moving the robotic arm of the positioning device 106, such that the article is between the sealing head 108 and the backing element 124 during the sealing operation. For example, the controller 116 may obtain additional information that indicates a sequence of positions for the additional robotic arm 122 that are to be used for a sealing operation, as described herein. As another example, the controller 116 may determine a sequence of positions for the additional robotic arm 122 based on the sequence of positions for the positioning device 106.

As indicated above, FIG. 3 is provided as an example. Other examples may differ from what is described with regard to FIG. 3.

Figure 4:
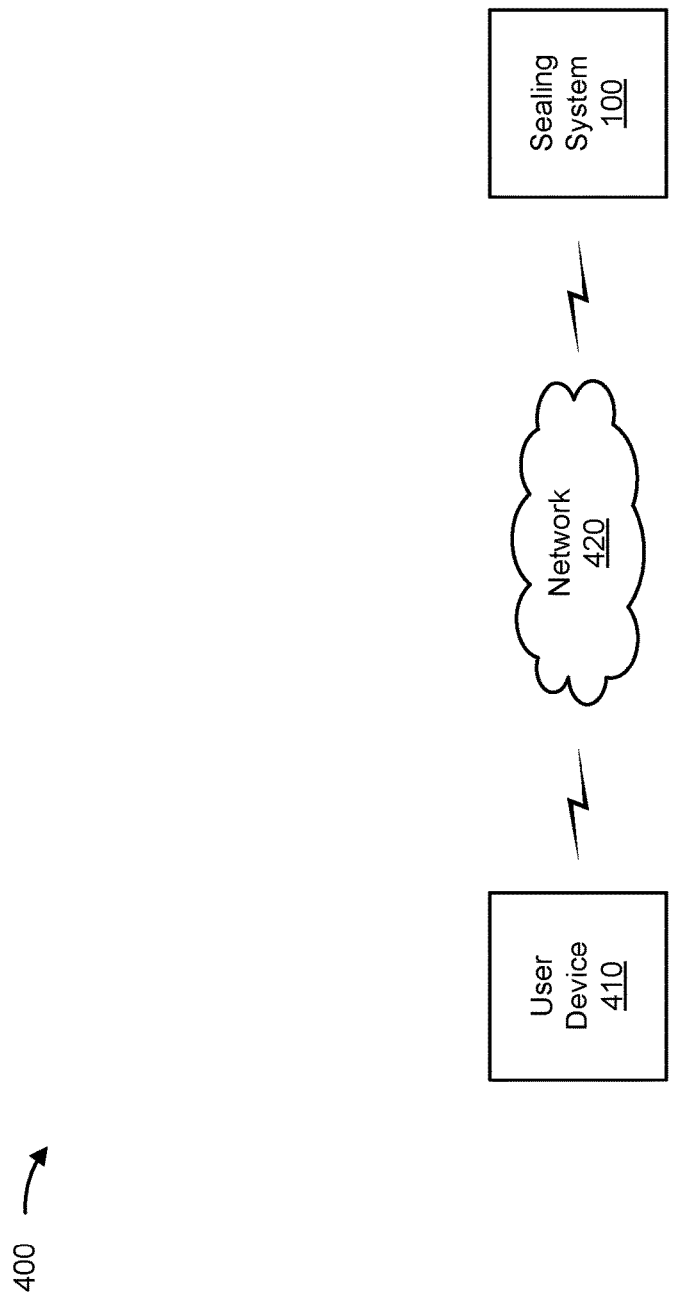
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a user device 410, the sealing system 100, and a network 420. Devices of environment 400 may interconnect via wired connections, wireless connections, or a combination of wired and wireless connections.

The user device 410 includes one or more devices capable of receiving, generating, storing, processing, and/or providing information associated with sealing an article, as described elsewhere herein. The user device 410 may include a communication device and/or a computing device. For example, the user device 410 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The sealing system 100, described herein, may include one or more devices capable of receiving, generating, storing, processing, and/or providing information associated with sealing an article, as described elsewhere herein.

The network 420 includes one or more wired and/or wireless networks. For example, the network 420 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 420 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
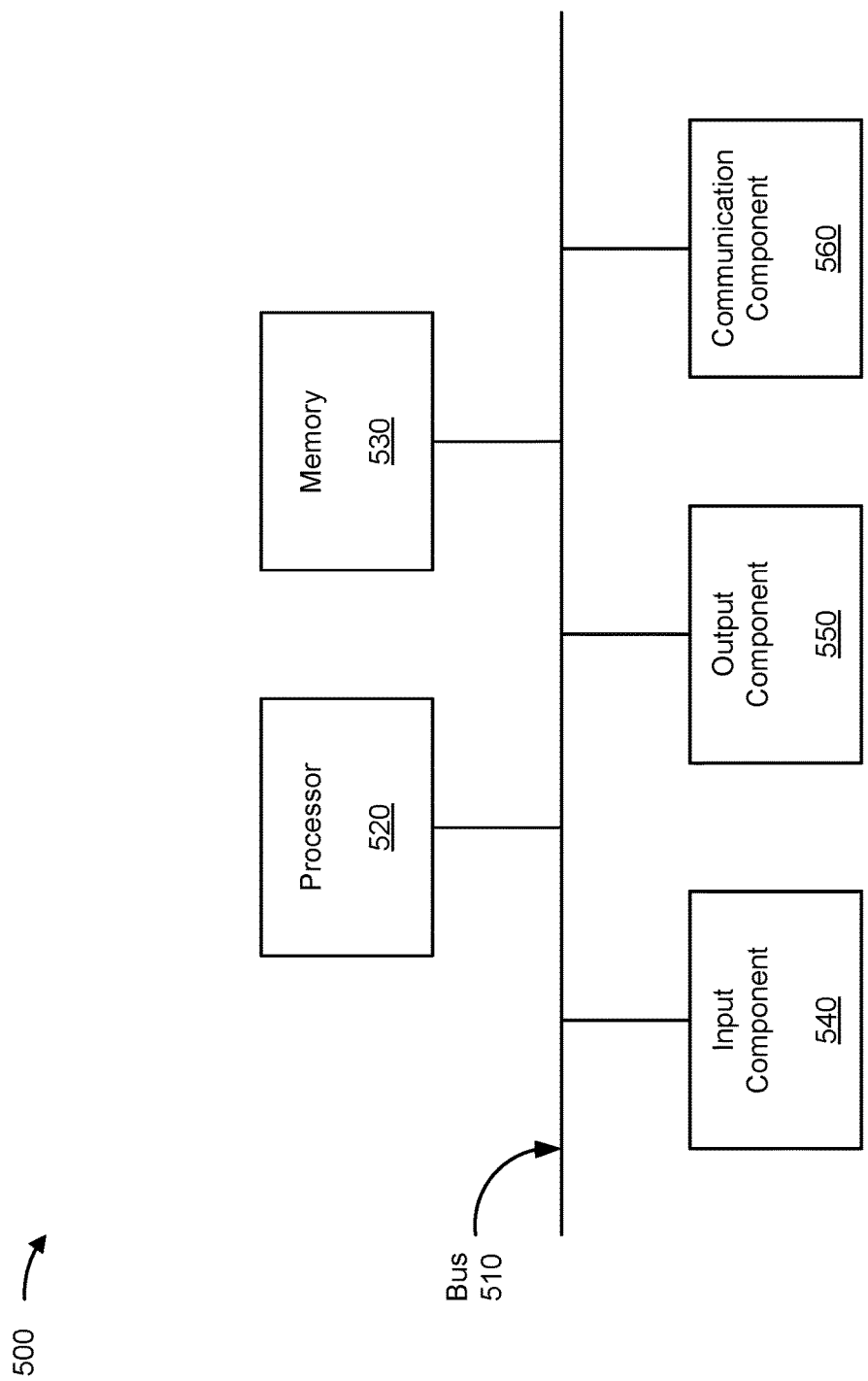
FIG. 5 is a diagram of example components of one or more devices of FIG. 4.

FIG. 5 is a diagram of example components of a device 500, which may correspond to user device 410 and/or sealing system 100 (e.g., controller 116 of sealing system 100). In some implementations, user device 410 and/or sealing system 100 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
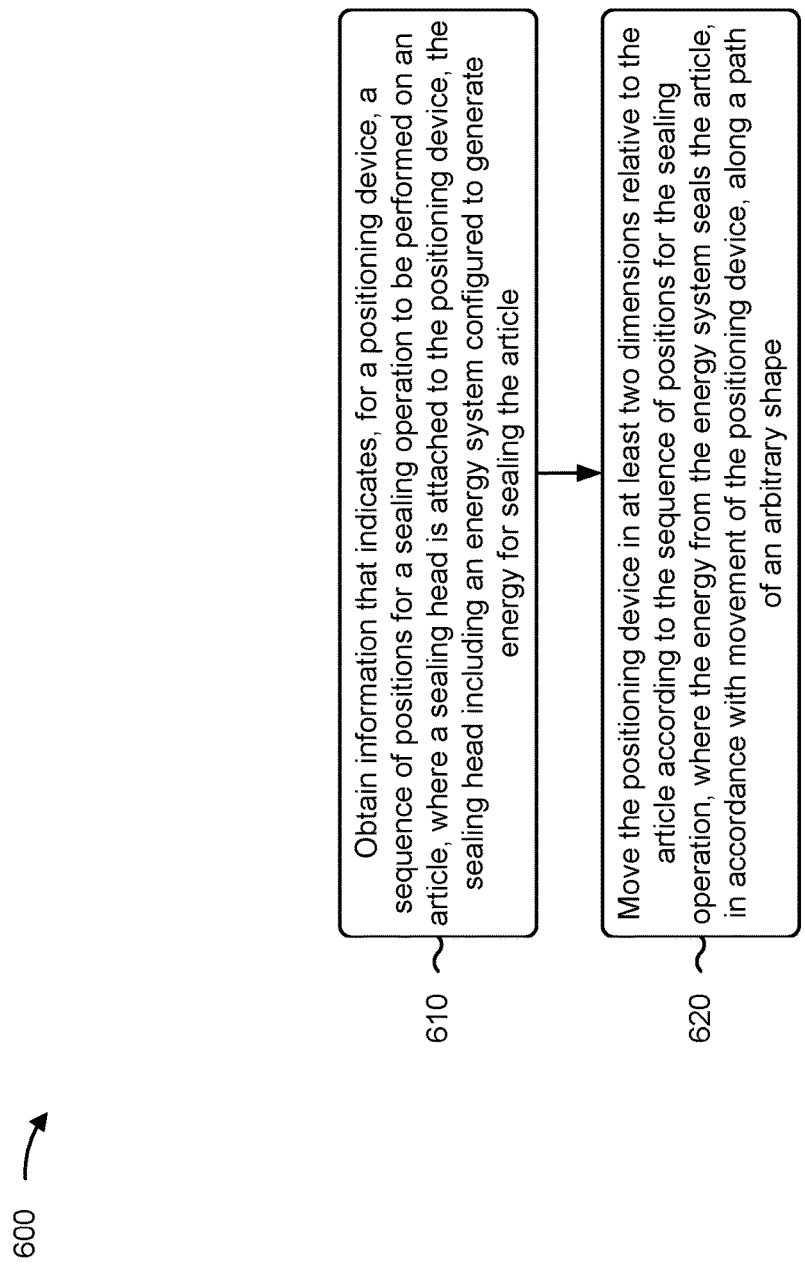
FIG. 6 is a flowchart of an example process relating to sealing an article.

FIG. 6 is a flowchart of an example process 600 associated with heat sealing. In some implementations, one or more process blocks of FIG. 6 may be performed by a device (e.g., sealing system 100). In some implementations, one or more process blocks of FIG. 6 may be performed by another device or a group of devices separate from or including the device, such as user device 410. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include obtaining information that indicates, for a positioning device, a sequence of positions for a sealing operation to be performed on an article, where a sealing head is attached to the positioning device, the sealing head including an energy system configured to generate energy for sealing the article (block 610). As further shown in FIG. 6, process 600 may include moving the positioning device in at least two dimensions relative to the article according to the sequence of positions for the sealing operation, where the energy from the energy system seals the article, in accordance with movement of the positioning device, along a path of an arbitrary shape (block 620).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1-3.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for heat sealing, comprising:
    a bed having a first surface that includes a resilient lining;
    a positioning device configured to move in at least two dimensions relative to the first surface of the bed;
    a sealing head attached to the positioning device, the sealing head including:
        a heating element, wherein the heating element includes a resistive heating element or an inductive heating element, and
        a tip element having a second surface, for contacting an article to be sealed, that is convex and non-stick; and
    a controller configured to:
        obtain information that indicates a sequence of positions for the positioning device for a sealing operation that is to produce a sealed path of an arbitrary shape on the article, and
        cause the positioning device to move relative to the first surface of the bed according to the sequence of positions for the sealing operation.

2. The system of claim 1, wherein the controller, to cause the positioning device to move, is configured to:
    cause the positioning device to move in the at least two dimensions relative to the first surface of the bed.

3. The system of claim 1, wherein the positioning device has at least three degrees of freedom.

4. The system of claim 1, wherein the positioning device is a robotic arm or a Cartesian coordinate robot.

5. The system of claim 1, wherein the second surface of the tip element includes borosilicate glass or ceramic.

6. The system of claim 1, wherein the sealing head includes a spring that spring-loads the tip element, and
    wherein the sealing head is configured to provide heat transfer from the heating element to the tip element when the spring is compressed.

7. The system of claim 1, wherein the tip element is spherical.

8. The system of claim 1, further comprising an inflation device configured to inflate the article to a maximum volume before the sealing operation.

9. The system of claim 1, wherein the resilient lining of the bed comprises silicone or polytetrafluoroethylene (PTFE).

10. The system of claim 1, further comprising a placing device configured to position the article to be sealed on the first surface of the bed.

11. A device for heat sealing, comprising:
    a positioning device configured to move in at least two dimensions; and
    a sealing head attached to the positioning device, the sealing head including:
        an energy system configured to generate energy for heat sealing an article along a path of an arbitrary shape, wherein the energy system includes a heating element and a tip element, and
        a spring that spring-loads the tip element, wherein the sealing head is configured to provide heat transfer from the heating element to the tip element when the spring is compressed.

12. The device of claim 11, wherein the positioning device includes a robotic arm.

13. The device of claim 12, further comprising:
    an additional robotic arm; and
    a backing element attached to the additional robotic arm, wherein the additional robotic arm is configured to position the backing element opposite the sealing head.

14. The device of claim 11, wherein the tip element comprises a surface, for contacting the article, that is convex and non-stick.

15. The device of claim 11, further comprising:
    a bed having a surface that includes a resilient lining,
        wherein the positioning device is configured to move in the at least two dimensions relative to the surface of the bed.

16. An apparatus for heat sealing, comprising:
    means for moving in at least two dimensions using a positioning device;
    means for attaching a sealing head to the positioning device, the sealing head including:
        an energy system configured to generate energy for heat sealing an article along a path of an arbitrary shape, wherein the energy system includes a heating element, and
        a spring, wherein the sealing head is configured to provide heat transfer from the heating element when the spring is compressed; and
    means for positioning a backing element opposite the sealing head using a robotic arm.

17. The apparatus of claim 16, wherein the energy system further includes a tip element having a surface, for contacting the article, that is convex and non-stick.

18. The apparatus of claim 17, wherein the tip element is spherical.

19. The apparatus of claim 16, wherein the positioning device includes an additional robotic arm.

20. The apparatus of claim 16, wherein the heating element includes a resistive heating element or an inductive heating element.

* * * * *